United States Patent Office 2,694,545
Patented Nov. 16, 1954

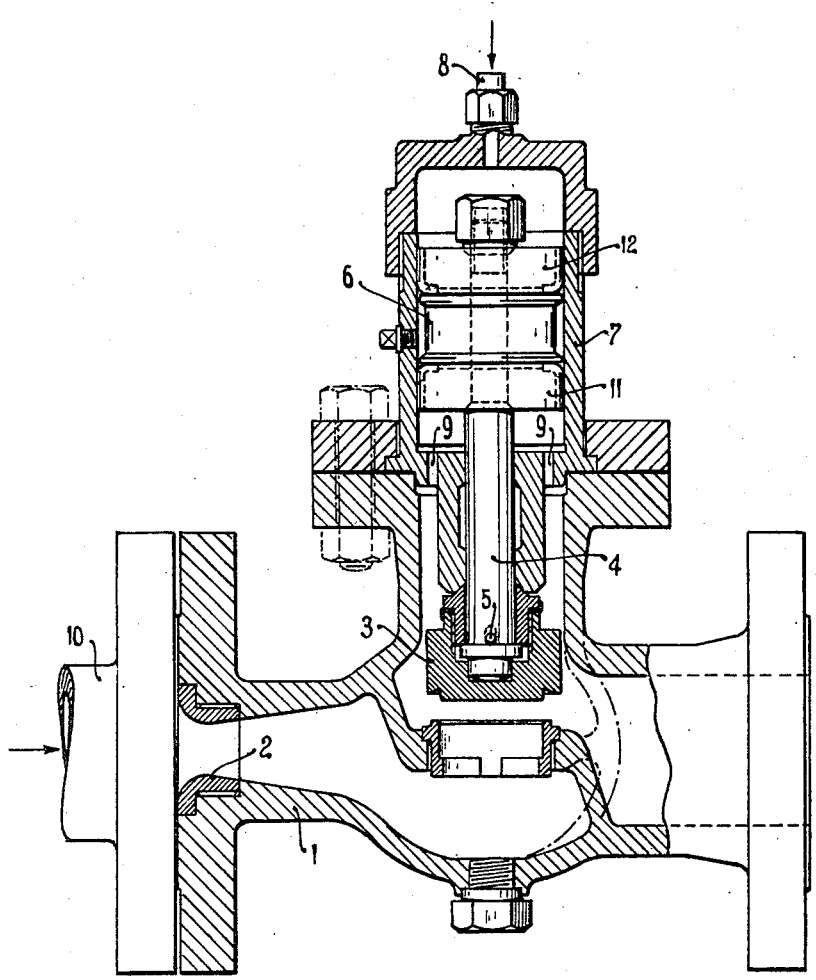

2,694,545

FLUID PRESSURE OPERATED VALVE

Alexander W. Steenbergh, Voorburg, Netherlands, assignor to G. Dikkers & Co. N. V., Hengelo, Netherlands, a company of the Netherlands Application May 6, 1950, Serial No. 160,409

Claims priority, application Netherlands May 12, 1949

1 Claim. (Cl. 251—62)

This invention relates to valves, and more particularly to a pressure actuated piston-type valve.

It is an object of the present invention to provide means facilitating the construction of a piston type valve which can be operated by a piston or diaphragm of relatively small size and still exhibit the desired quick response in closing.

It is another object of the present invention to provide means permitting the operation of a piston-type valve by a pressure equal to or slightly less than the pressure at the inlet side of the valve.

It is a further object of the present invention to provide means decreasing the velocity of the fluid flowing through the aforesaid valve to thereby substantially decrease wearing of the valve components.

It is a still further object of the present invention to provide means rendering it possible to reduce the pressure necessary to effect closing of valves of the aforesaid type.

According to the present invention the space opposite to that side of the piston to which the fluid under pressure is supplied is connected to the discharge side of the valve casing. The cross-sectional area at the inlet side of the valve casing is reduced as compared to the cross-sectional area at the outlet side and of the inlet conduit. With this arrangement the space below the piston is in open communication with the discharge side of the valve casing, and the fluid pressure developed below the piston will, due to the reduction of the flow area at the inlet side of the valve, be smaller than the inlet pressure during fluid flow. Moreover, as the space below the piston need not be sealed with respect to the interior of the valve casing, it will be possible to omit a stuffing box for the passage of the valve rod through the end wall of the cylinder in which the piston operates. Further the valve may be operated with a fluid pressure which is equal to or even smaller than the pressure of the fluid at the inlet side of the valve and the diameter of the piston or diaphragm need not considerably exceed that of the valve member for securing a quick closing of the valve. Even if the conduit at the discharge side of the valve casing presents additional resistance, a quick response is assured since the fluid pressure below the valve element will always be less than the inlet pressure during fluid flow.

The valve according to the present invention may, for example, be used for discharging oil from a separator in which oil is separated from gas. The pressure of the gas separated in the separator may be utilized for operating the valve.

The above description and objects will be best understood by reference to the specification in conjunction with the drawing, wherein:

The drawing shows a vertical sectional view of a valve according to the invention.

The valve casing 1 at the inlet side is provided with an insert 2 having a reduced passage area. The valve body 3 by means of a pin 5 is secured to the rod 4 and said rod carries a piston 6 moving in a cylinder 7. The fluid for operating the valve is introduced into the cylinder 7 at 8 and said fluid may be the same as that flowing through the valve to accomplish this, the port 8 may be connected to the inlet conduit 10.

The space below the piston 6 by means of passages 9 is connected to the discharge side of the valve casing so that the pressure developed below the piston is always the same as that at the discharge side of the valve when the same is open. Due to the reduced passage area of the insert 2 and the resulting flow resistance increased by that of the valve element said pressure will be smaller than the pressure upstream of the insert 2 so that the valve can be closed by a pressure equal to said upstream pressure or even smaller than said pressure. In order to open the valve, the pressure above the piston is to be relieved by suitable means.

The piston 6 has two oppositely directed sealing sleeves 11, 12 which prevent the pressure fluid from leaking from the space above the piston towards the valve casing as well as from the casing towards the space above the piston.

It is to be noted that the reduced passage area at the inlet side of the valve need not be provided in the valve casing itself but said reduced passage area may also be arranged in the supply conduit 10 at some distance in front of the valve.

Accordingly, there has been provided a pressure responsive valve comprising a valve casing having an inlet passage with an inlet opening at one end thereof, an outlet passage, and a valve seat intermediate said passages, said inlet opening being provided with flow restricting means decreasing the area of said inlet opening relative to the area of said outlet passage, said flow restricting means including an insert provided with a restricted area smaller than the area of the inlet passage and wherein said area of the inlet passage is smaller than the area of said outlet passage, a cylinder communicating at one end thereof with said outlet passage, conduit means for connecting the opposite end of said cylinder to a source of pressure fluid, and piston means positioned in said cylinder and connected to said valve means, whereby fluid pressure on opposite sides of said piston means is unbalanced, and said valve means is either automatically shut off when fluid pressure on the piston from said conduit means increases above that in said outlet passage or automatically opened when fluid pressure from said conduit means decreases below that of said outlet passage.

Although only one embodiment of the invention has been described and shown in the drawing, it should be noted that the invention may be realized in modified form and adaptations of the arrangements herein disclosed may be made as may readily occur to persons skilled in the art without constituting a departure from the spirit and scope of the invention as defined in the objects and in the appended claim.

What I claim is:

A pressure responsive valve comprising a valve casing having an inlet passage with an inlet opening at one end thereof, an outlet passage, and a valve seat intermediate said passages, said inlet opening being provided with flow restricting means decreasing the area of said inlet opening relative to the area of said outlet passage, said flow restricting means including an insert provided with a restricted area smaller than the area of the inlet passage and wherein said area of the inlet passage is smaller than the area of said outlet passage, a cylinder communicating at one end thereof with said outlet passage, conduit means for connecting the opposite end of said cylinder to a source of pressure fluid, and piston means positioned in said cylinder and connected to said valve means, whereby fluid pressure on opposite sides of said piston means is unbalanced, and said valve means is either automatically shut off when fluid pressure on the piston from said conduit means increases above that in said outlet passage or automatically opened when fluid pressure from said conduit means decreases below that of said outlet passage.

References Cited in the file of this patent

UNITED STATES PATENTS

| Number | Name | Date |
| --- | --- | --- |
| 207,615 | McElroy | Sept. 3, 1878 |
| 569,781 | Brown | Oct. 20, 1896 |
| 1,901,119 | Putnam | Mar. 14, 1933 |
| 2,227,207 | Coy | Dec. 31, 1940 |
| 2,517,534 | Courtot | Aug. 8, 1950 |